Feb. 6, 1962  S. HACKNEY  3,020,226
NUCLEAR REACTOR MODERATOR STRUCTURES
Filed July 1, 1958
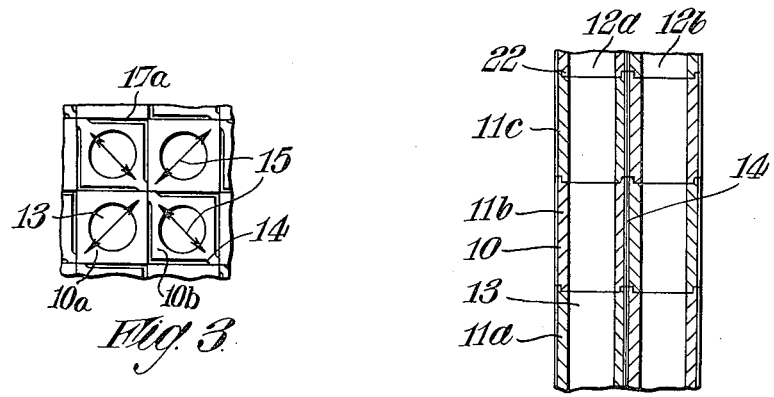
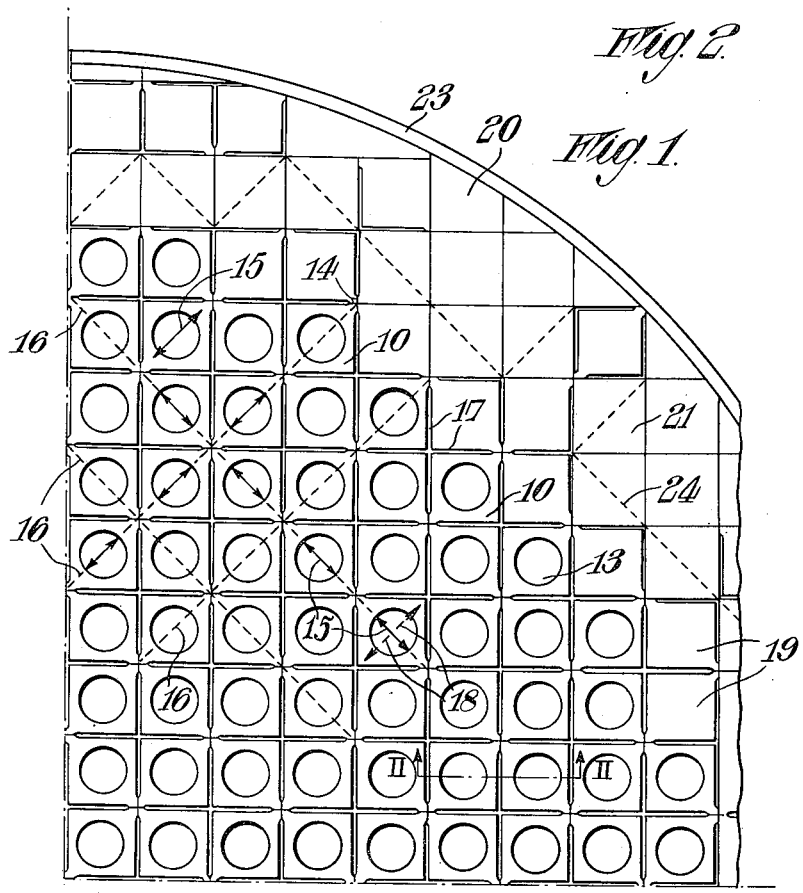
INVENTOR -
STANLEY HACKNEY
BY
ATTORNEYS

United States Patent Office 3,020,226
Patented Feb. 6, 1962

3,020,226
NUCLEAR REACTOR MODERATOR STRUCTURES
Stanley Hackney, Fearnhead, Warrington, England, assignor to United Kingdom Atomic Energy Authority, London, England
Filed July 1, 1958, Ser. No. 745,885
Claims priority, application Great Britain July 1, 1957
1 Claim. (Cl. 204—193.2)

This invention relates to graphite moderator structures for nuclear reactors.

In nuclear reactors of the gas cooled thermal type fissile material is disposed in a moderator structure comprising blocks of graphite. Such a moderator structure is subject to growth due to irradiation and thermal effects, growth due to irradiation (hereinafter referred to as Wigner growth) being anisotropic, having a minimum value in a direction parallel to the direction of extrusion of the graphite blocks and a maximum value in directions normal to the direction of extrusion. The growth due to thermal effects is thought to be generally isotropic.

According to the present invention a graphite moderator structure is made up of right prismatic blocks of basic rectangular section, stacked on a rectangular lattice in columns abutting on their side faces and having fuel element channels passing through the blocks in the direction of the axes of the columns, characterised in that the direction of minimum Wigner growth is perpendicular to the axes of the fuel element channels in all blocks but changes between blocks so as to be in the direction of one diagonal plane in any one block and in the direction of the other diagonal plane in any of the blocks adjacent to the side faces thereof, the side faces being recessed to accommodate Wigner growth perpendicular to said diagonal planes.

The invention will now be described with reference to the accompanying drawings wherein:

FIG. 1 is a plan view of one quadrant of a vertically orientated graphite moderator structure.

FIG. 2 is a sectional elevation on the line II—II of FIG. 1.

FIG. 3 is a plan view of an arrangement alternative to that shown in FIG. 1.

Referring to FIGS. 1 and 2 a moderator structure is made up of cubic blocks 10 in layers 11a, 11b etc. the layers being stacked together to form columns 12a, 12b etc. with coolant channels 13. The blocks in the columns are located by spigots 22. The blocks 10 (and hence the columns 12a, 12b etc.) abut one another on their side faces 14. The blocks have minimum Wigner growth properties as indicated by arrows 15. It is seen that the direction of the arrows 15 changes between adjacent blocks so as to be first in one direction and then in a direction perpendicular thereto whilst along any diagonal (such as indicated by dotted lines 16) the direction is always the same. The blocks have recesses 17 which allow space for Wigner growth (at a rate greater than along the arrows 15) along directions perpendicular to the arrows 15 as indicated by dotted arrows 18. The blocks 10 together form the core of the moderator and they are surrounded by blocks 19, which have no coolant channels 13 but still retain the cut away faces 17, and then blocks 21 split along dotted lines 24 to form wedges and lastly packing blocks 20. The blocks 19, 20 and 21 form the reflector part of the moderator structure and whole structure is contained within a steel vessel 23. The blocks 21 are each split by two slant-wise cuts, both starting at the line 24 and ending at or near the diagonally opposite bottom corners of the block so that the block is split into three parts.

Loading of the wedges is provided by thrust rods which extend to a point outside the reactor to spring loaded caps as described in the co-pending application of Hackney and Munn, Serial No. 745,853, filed July 1, 1958. The wedge action keeps the moderator structure fully restrained in the radial direction, the reaction to the restraint being taken by the vessel 23. In the course of growth under irradiation the columns 13 grow at a rate determined by the Wigner growth factor in a direction transverse to the direction of extrusion of the blocks (i.e. the major rate). In radial directions the growth is at the minor rate.

In FIG. 3 an alternative arrangement of the blocks 10 is shown. Instead of having only one type of block for the core (as in FIG. 1) two types of block are now provided: a plain block 10a and cut away block 10b, the cut away parts 17a being twice the depth of the cut away parts 17 in FIG. 1. Arrangement of FIG. 3 reduces machining operations on the block but it does introduce the risk of incorrect orientation of the plain blocks which lack any distinctive features related to their Wigner growth properties.

An advantage which arises from having the direction of minimum Wigner growth in the blocks 10 orientated as shown is that bowing of the fuel element channels 13 due to Wigner growth is minimised.

I claim:

A graphite moderator structure comprising right prismatic blocks of basic rectangular section and stacked on a rectangular lattice in columns, each block engaging at its side faces with adjacent blocks and defining a fuel element channel passing through the block in the direction of the axes of the columns, the direction of minimum Wigner growth in all blocks being perpendicular to the axes of the fuel element channels but changing between blocks so as to be in the direction of one diagonal plane in any one block and in the direction of the other diagonal plane in any of the blocks adjacent to the side faces thereof, the side faces being recessed to accommodate Wigner growth perpendicular to said diagonal planes.

References Cited in the file of this patent
UNITED STATES PATENTS
2,780,596   Anderson _____ Feb. 5, 1957
2,852,457   Long et al. _____ Sept. 16, 1958